United States Patent Office 3,551,451
Patented Dec. 29, 1970

1

3,551,451
TRIFLUOROMETHYL-SUBSTITUTED 2,3-BIS-
(p-METHOXYPHENYL)INDOLES
Jacob Szmuszkovicz, Kalamazoo, Mich., assignor to The
Upjohn Company, Kalamazoo, Mich., a corporation of
Delaware
No Drawing. Filed May 26, 1967, Ser. No. 641,448
Int. Cl. C07d 27/56
U.S. Cl. 260—326.16                                 5 Claims

ABSTRACT OF THE DISCLOSURE

Trifluoromethyl-2,3-bis-(p-methoxyphenyl)indoles and methods for their preparation are disclosed. These compounds are useful as anti-inflammatory, antipyretic, and analgesic agents.

BACKGROUND OF THE INVENTION

While compounds having anti-inflammatory, antipyretic, and analgesic properties are known to the art, the art is devoid of any suggestion that the herein claimed compounds are suitable for that purpose.

SUMMARY OF THE INVENTION

The compounds of this invention are trifluoromethyl-substituted 2,3-bis-(p-methoxyphenyl)indoles which can be represented by the formula

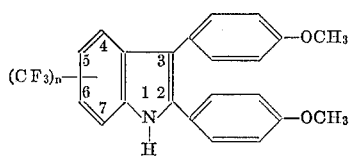

(I)

wherein $n$ is an integer having a value of 1 or 2.

The instant compounds are useful an anti-inflammatory, antipyretic, and analgesic agents.

DETAILED DESCRIPTION

The trifluoromethyl-substituted 2,3 - bis-(p-methoxyphenyl)-indoles shown by Formula 1 can be mono- or disubstituted with trifluoromethyl groups, these trifluoromethyl substituents being present in the 4-, 5-, 6-, or 7- positions on the indole nucleus.

The compounds of this invention can be prepared by reacting 4' - methoxy-2-(p-methoxyphenyl)acetophenone (commonly referred to as desoxyanisoin) with a phenylhydrazine represented by the formula

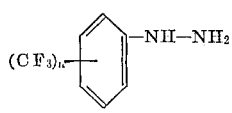

(II)

wherein $n$ has the same meaning as above.

Illustrative of the compounds within the purview of Formula II are o-trifluoromethylphenylhydrazine, m-trifluoromethylphenylhydrazine, p-trifluoromethylphenylhydrazine, 3,5-di(trifluoromethyl)phenylhydrazine, and 3,4-di(trifluoromethyl)phenylhydrazine. These compounds can be prepared by the process described by Forbes et al., Tetrahedron 8, 67 (1960).

2

The reaction sequence is exemplified below, showing the preparation of 7-trifluoromethyl-2,3-bis-(p-methoxyphenyl)-indole:

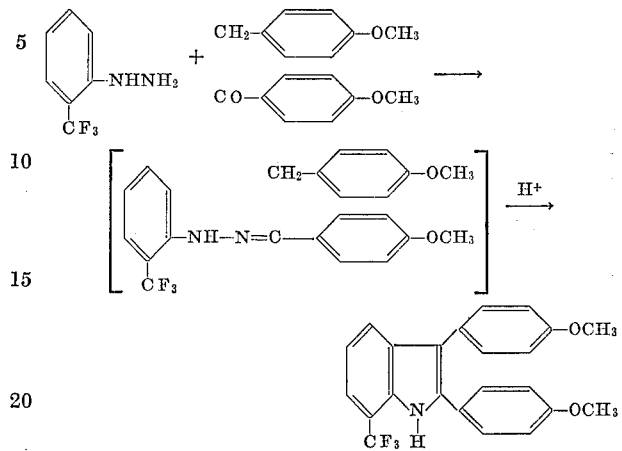

The foregoing reaction proceeds in accordance with the well-known Fisher indole synthesis. The reaction conditions therefor can be found in the literature, particularly in German Pat. 574,840 and in Coldham et al., J. Chem. Soc. 1954, 4528.

Alternatively, the compounds of this invention can be prepared by reacting 4,4'-dimethoxybenzoin (commonly referred to as anisoin) with an aniline represented by the formula

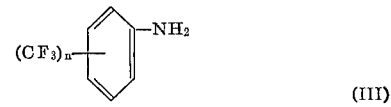

(III)

wherein $n$ has the same meaning as before.

Illustrative compounds of the type represented by Formula III are o-trifluoromethylaniline, m-trifluoromethylaniline, p-trifluoromethylaniline, 3,5 - di(trifluoromethyl)aniline, 3,4 - di-(trifluoromethyl)aniline, 2,3 - di(trifluoromethyl)aniline, 2,5 - di(trifluoromethyl)aniline, and 2,4 - di(trifluoromethyl)aniline. These compounds are known in the art and many are commercially available.

The reaction sequence is exemplified below, showing the preparation of 7-trifluoromethyl-2,3-bis-(p-methoxyphenyl)indole:

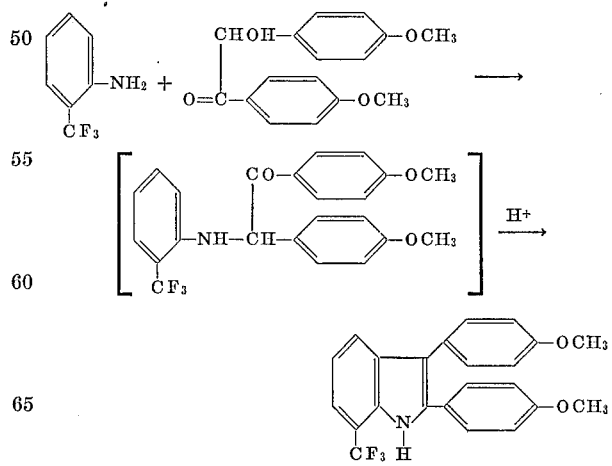

The above condensation reaction can be carried out in one step following the teachings of the art, for example, Japp et al., Ber. 26, 2638 (1893); Ritchie, J. Proc. Roy. Soc. N. S. Wales 80, 33 (1946) [C. A. 41, 3094 (1947)];

Baroni et al., Zhur. Obshcei. Khim. 29, 3815 (1959) [C. A. 54, 19643 (1969)]; Coldham et al., supra.

In the foregoing reactions, when the trifluoromethyl substituent is in the meta-position on the aniline or the phenylhydrazine, or when, in the case of a disubstituted compound, the substituents are in meta- and para-positions, a mixture of isomers of 2,3-bis-(p-methoxyphenyl) indole are produced. Thus in the former instance the reaction product is a mixture of 4-trifluoromethyl-2,3-bis (p-methoxyphenyl)indole and 6-trifluoromethyl-2,3-bis- (p-methoxyphenyl)indole, while in the latter instance the reaction product is a mixture of 4,5-di(trifluoromethyl)- 2,3-bis-(p-methoxyphenyl)indole and 5,6 - di(trifluoromethyl)-2,3-bis-(p-methoxyphenyl)indole.

The compounds shown by Formula I can also be prepared by a two-step process using an aniline (III) and anisoin as the starting materials. In the first process step, the aforesaid starting materials are condensed in accordance with the teachings of Pratt et al., J. Org. Chem. 28, 1366 (1963) and Novelli et al., Anales Asoc. Quim. Argentina 31, 147 (1943) [C. A. 38, 2957 (1944)], to obtain a 2 - anilino - 4'-methoxy-2-(p-methoxyphenyl)- acetophenone which can be represented by the formula

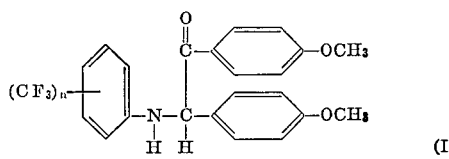

(IV)

wherein $n$ has the same meaning as before.

The condensation can be effected by heating the aforesaid reactants in the presence of a strong acid, such as concentrated hydrochloric acid, for example. The condensation can also be carried out in the presence of p-toluenesulfonic acid and an inert aromatic solvent such as benzene. The water that forms during the reaction can be removed by azeotropic distillation.

The thus-obtained Formula IV compound can then be cyclized to obtain the desired Formula I 2,3-bis-(p-methoxyphenyl)indole. The cyclization can be carried out by heating the Formula IV compound at temperatures in the range from about 150° C. to about 250° C. in the presence of a strong acid, such as sulfuric, oxalic, p-toluenesulfonic acid, for example, and in an inert liquid such as p-cymene, mineral oil, decahydronaphthalene, and the like. [See Kamlet et al., J. Org. Chem. 26, 220 (1961).]

A further process for the preparation of compounds of the present invention involves the condensation of an aniline (III) with a 2-halo-4'-methoxy-2-(p-methoxy- phenyl)acetophenone [Drefahl et al., Ann. 589, 82 (1954)] represented by the formula

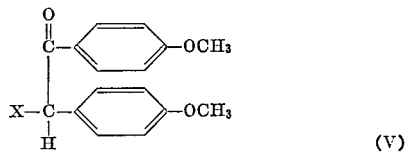

(V)

wherein X is a halo group such as chloro, bromo, or iodo, and preferably bromo. Preferably at least about two molar amounts of the aniline (III) are employed for one molar amount of the acetophenone (V).

This invention is further illustrated by the following examples:

EXAMPLE I

Preparation of 4 - trifluoromethyl - 2,3-bis-(p-methoxy- phenyl)indole and 6-trifluoromethyl - 2,3 - bis - (p- methoxyphenyl)indole A reaction mixture of m-trifluoromethylphenylhydrazine (about 92.8 grams, 0.527 mole), desoxyanisoin (about 135 grams, 0.527 mole), benzene (about 1,850 milliliters), and acetic acid (about 10.6 milliliters) was prepared and refluxed under nitrogen for about six hours using an azeotropic separator. During this time period about 9.2 milliliters of an aqueous phase was collected.

After refluxing, the reaction mixture was evaporated to dryness, ethylene glycol (about 1,600 milliliters) was added to the obtained residue, and the resulting mixture was refluxed for about 18 hours. Thereafter the mixture was cooled, poured into water (about 3 liters), and a product was extracted therefrom with eight 200 milliliter aliquots of diethyl ether.

The obtained diethyl ether extract was washed with water, a 5 percent aqueous sodium hydroxide solution (2×200 milliliters), water, a 5 percent aqueous hydrochloric acid solution (2×200 milliliters), an aqueous saturated sodium chloride solution, and then dried over anhydrous magnesium sulfate.

The dried extract was then treated with activated charcoal, filtered through diatomaceous earth, evaporated to a volume of about 1 liter, and cooled to about 4° C., and maintained at about that temperature for about one week.

Crystals were observed to form in the cooled extract and were recovered by filtration. About 0.9 gram of crystals, melting at 210° to 211° C. was obtained. The melting point of the crystals was raised to 211° to 212° C. on recrystallization from methylene chloride-methanol. The crystals were identified as ethylene glycol diketal of anisil.

Analysis.—Calcd. for $C_{20}H_{22}O_6$ (percent): C, 67.02; H, 6.19. Found (percent): C, 66.78; H, 6.13.

The filtrate obtained above was evaporated to dryness and about 167 grams of a crude product was obtained. About 140 grams of the crude product was dissolved in methylene chloride (about 400 milliliters) and chromatographed on 5 kilograms of anhydrous magnesium silicate. Methylene chloride was employed as the eluant and fractions having a volume of about 400 milliliters were collected.

Fractions 1 through 15 yielded no material. Fractions 16 through 18 were discarded. Fractions 19 through 33 were combined and yielded about 63 grams of material which was dissolved in methylene chloride (about 500 milliliters) and chromatographed on 5 kilograms of anhydrous magnesium silicate. Elution with 22 aliquots, each 400 milliliters, of methylene chloride gave no product. Elution thereafter was continued using 250 milliliter aliquots.

Fractions 25 through 28 yielded a product which was crystallized from diethyl ether-petroleum ether; about 6 grams of a crystalline product melting at 170° to 171° C. was obtained. The crystalline product was identified as 6-trifluoromethyl-2,3-bis - (p-methoxyphenyl)indole, obtained in about 3.4 percent yield.

Analysis.—Calc'd. for $C_{23}H_{18}F_3NO_2$ (percent): C, 69.51; H, 4.56; F, 14.34; N, 3.53. Found (percent): C, 69.45; H, 4.57; F, 15.15; N, 3.50.

Eluted fractions 29 through 32 produced about 11.4 grams of a mixture which was not investigated.

Fractions 33 through 45 were crystallized from a mixture of diethyl ether and petroleum ether; about 15.4 grams of a crystalline compound melting at 167° to 168.5° C. was obained. The melting point was raised to 168.5° to 170° C. upon recrystallization from the same solvent mixture. The crystalline compound was identified as 4-trifluoromethyl-2,3-bis-(p-methoxyphenyl) - indole, obtained in about 8.8 percent yield.

Analysis.—Calc'd. for $C_{23}H_{18}F_3NO_2$ (percent): C, 69.51; H, 4.56; F, 14.34; N, 3.53. Found (percent): C, 69.97; H, 4.68; F, 14.38; N, 3.40.

EXAMPLE II

Preparation of 5-trifluoromethyl-2,3-bis-(p-methoxyphenyl)indole from p-trifluoromethylaniline and anisoin A reaction mixture of p-trifluoromethylaniline (about 80.5 grams, 0.5 mole), anisoin (about 27.2 grams, 0.1 mole), and concentrated hydrochloric acid (about 6.6 milliliters) was prepared, heated to about 120° C., and maintained at that temperature for about 20 minutes. During this time period some water was distilled off. Thereafter, the reaction mixture was heated to and maintained at about 180° C. for about 30 minutes. Then the mixture was cooled, water (about 200 milliliters) added thereto, and the produced reaction product was extracted with methylene chloride.

The obtained organic extract was washed with four 100-milliliter aliquots of a 10 percent aqueous hydrochloric acid solution, water, four 100-milliliter aliquots of a 10 percent aqueous sodium hydroxide solution, water, saturated aqueous sodium chloride solution, and then dried over anhydrous sodium sulfate.

Methylene chloride was then evaporated from the extract, and the produced residue (about 76 grams) was dissolved in methylene chloride (about 300 milliliters) and chromatographed on about 2,280 grams of anhydrous magnesium silicate. Elution with about 2,800 milliliters of methylene chloride yielded no product. Further elution with eight aliquots of methylene chloride, about 400 milliliters each, yielded fractions which were crystallized from ethanol. About 0.75 gram of a crystalline material melting at 190° to 191° C. was obtained. The melting point was unchanged on recrystallization. The material was identified as 5-trifluoromethyl-2,3-bis-(p-methoxyphenyl)indole, obtained in about 1.9 percent yield.

*Analysis.*—Calc'd. for $C_{23}H_{18}F_3NO_2$ (percent): C, 69.51; H, 4.56; F, 14.34; N, 3.53. Found (percent): C, 69.36; H, 5.11; F, 14.33; N, 3.87.

In a similar manner, but starting with 3,5-di(trifluoromethyl)aniline the 4,6 - di(trifluoromethyl)-2,3 - bis - (p-methoxyphenyl)indole can be prepared; starting with 2,3-di(trifluoromethyl)aniline the 6,7-di(trifluoromethyl)-2,3-bis-(p-methoxyphenyl)indole can be prepared; starting with 3,4-di(trifluoromethyl)aniline a mixture of 4,5-di(trifluoromethyl)-2,3-bis-(p-methoxyphenyl)indole and 5,6-di(trifluoromethyl)-2,3-bis - (p-methoxyphenyl)indole can be prepared; starting with 2,5-di(trifluoromethyl)aniline the 4,7-di(trifluoromethyl)-2,3-bis-(p-methoxyphenyl)indole can be prepared; starting with 2,4-di(trifluoromethyl)aniline the 5,7-di(trifluoromethyl)-2,3-bis - (p - methoxyphenyl)indole can be prepared, etc.

EXAMPLE III

Preparation of 5-trifluoromethyl-2,3-bis-(p-methoxyphenyl)indole from p-trifluoromethylphenylhydrazine and desoxyanisoin A solution was prepared from p-trifluoromethylphenylhydrazine (about 51.73 grams, 0.294 mole), desoxyanisoin (about 75.3 grams, 0.294 mole), acetic acid (about 7.4 milliliters), and benzene (about 1,450 milliliters), and refluxed under a water trap for about four hours. Thereafter the solution was evaporated to dryness and the obtained residue was suspended in ethylene glycol (about 880 milliliters).

The resulting suspension was stirred for about eight hours under reflux conditions, then permitted to cool to about room temperature, and diluted with water. A gum-like precipitate was recovered therefrom and was extracted with benzene.

The benzene layer obtained during extraction was washed with water and then saturated aqueous sodium chloride solution, and evaporated to dryness. The produced residue was chromatographed on about 5 kilograms of silica gel with methylene chloride. Those fractions which showed a single fluorescent spot by thin layer chromatography were continued. The obtained product was recrystallized from methanol and about 7.5 grams of crystalline compound melting at 186° to 189° C. was recovered. The crystalline compound was identified as 5-trifluoromethyl-2,3-bis - (p-methoxyphenyl)indole, obtained in about 6.4 percent yield.

EXAMPLE IV

Preparation of 7-trifluoromethyl-2,3-bis-(p-methoxyphenyl)indole from o-trifluoromethylaniline and anisoin A stirred mixture of o-trifluoromethylaniline (about 80.5 grams, 0.5 mole), anisoin (about 27.2 grams, 0.1 mole), and concentrated hydrochloric acid, about 6.6 milliliters) was heated to and maintained at about 115° C. for about 30 minutes in a reaction vessel fitted with a reflux condenser. Thereafter the condenser was removed and replaced with a take-off condenser.

The mixture within the reaction vessel was then distilled until the temperature of the mixture reached about 180° C., at which temperature the mixture was held for about one hour. Then the mixture was cooled to about 100° C. and water (about 50 milliliters) was added thereto. After the water addition, the resutling mixture was extracted twice with methylene chloride (total amount about 150 milliliters).

The methylene chloride extract was washed with four 100-milliliter aliquots of a 10 percent aqueous hydrochloric acid solution, then with four 100-milliliter aliquots of a 10 percent aqueous sodium hydroxide solution, dried by passing through sodium sulfate, and then evaporated to dryness.

The obtained residue (about 80 grams) was dissolved in methylene chloride (about 200 milliliters) and chromatographed on about 2,400 grams of anhydrous magnesium siilcate. Elution with 2.4 liters of methylene chloride yielded no material. Further elution with four aliquots, 250 milliliters each, yielded fractions which crystallized from methanol. About 1.5 grams of a crystalline product melting at 165° to 166° C. was recovered. The melting point was unchanged on recrystallization from methanol-diethyl ether. The crystalline product was identified as 7-trifluoromethyl-2,3-bis-(p-methoxyphenyl)-indole, obtained in about 3.8 percent yield.

*Analysis.*—Calc'd. for $C_{23}H_{18}F_3NO_2$ (percent): C, 69.51; H, 4.56; F, 14.34; N, 3.53. Found (percent): C, 69.65; H, 4.80; F, 14.30; N, 3.64.

EXAMPLE V

Preparation of 7-trifluoromethyl-2,3-bis-(p-methoxyphenyl)indole from o-trifluoromethylphenyl-hydrazine and desoxyanisoin A reaction mixture of o-trifluoromethylphenylhydrazine (about 11 grams, 0.0625 mole), desoxyanisoin (about 15.6 grams, 0.0625 mole), benzene (about 220 milliliters), and acetic acid (about 0.61 milliliter) was refluxed for about five hours using an azeotropic separator. During this time about 0.55 milliliter of an aqueous phase was collected.

The remainder of the reaction mixture was evaporated to dryness, ethylene glycol (about 190 milliliters) was added to the residue, and the resulting mixture was refluxed for about 19 hours.

After refluxing, the obtained mixture was cooled, poured into water (about 400 milliliters), and extracted with four aliquots of diethyl ether, about 200 milliliters each.

The diethyl ether extract was washed with two 50-milliliter aliquots of a 5 percent aqueous hydrochloric acid solution, water, two 50-milliliter aliquots of a 5 percent aqueous sodium hydroxide solution, a saturated aqueous sodium chloride solution, then dried over anhydrous magnesium sulfate, and evaporated to drynes.

The obtained residue (about 22 grams) was dissolved in methylene chloride (about 50 milliliters), and was chromatographed over 1,100 grams of anhydrous magnesium silicate. Elution with 1,450 milliliters of methylene chloride gave no material. Further elution with five 250-milliliter aliquots of methylene chloride yielded fractions which were crystallized from methanol-diethyl ether. About 3.47 grams of a crystalline material melting at about 163° to 164° C. was produced. The material was identified as 7-trifluoromethyl-2,3-bis-(p-methoxyphenyl) indole, obtained in about 14 percent yield.

The compounds of this invention are anti-inflammatory, analgesic, and antipyretic agents useful for birds and mammals. The compounds can be applied topically and employed orally or parenterally for the relief of rheumatic, allergic, dermatological, and ocular conditions generally responsive to anti-inflammatory agents, and for the relief of pain and fever.

The compounds of this invention also find application in the local treatment of inflammatory conditions in animal mastitis, a disease of the mammary glands, which can be of particular concern in milk producing animals such as cows.

I claim:

1. A trifluoromethyl-substituted 2,3-bis(p-methoxyphenyl)indole represented by the formula

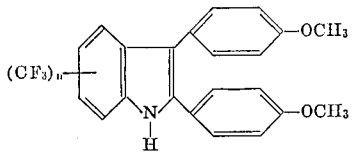

wherein $n$ is an integer having a value from 1 to 2 inclusive.

2. A trifluoromethyl-substituted 2,3-bis-(p-methoxyphenyl)indole in accordance with claim 1 wherein $n$ is 1, and the trifluoromethyl group is substituted in the 4-position.

3. A trifluoromethyl-substituted 2,3-bis-(p-methoxyphenyl)indole in accordance with claim 1 wherein $n$ is 1, and the trifluoromethyl group is substituted in the 6-position.

4. A trifluoromethyl-substituted 2,3-bis-(p-methoxyphenyl)indole in accordance with claim 1 wherein $n$ is 1, and the trifluoromethyl group is substituted in the 5-position.

5. A trifluoromethyl-substituted 2,3-bis(p-methoxyphenyl)indole in accordance with claim 1 wherein $n$ is 1, and the trifluoromethyl group is subtsituted in the 7-position.

References Cited

UNITED STATES PATENTS 3,409,634  11/1968  Szmuszkovicz _____ 260—326.16
3,242,192  3/1966  Shen et al. _____ 260—326.16X

OTHER REFERENCES

Szmuszkovicz et al., J. Med. Chem. 9, 527–532 (1966).
Yale, J. Med. & Pharm. Chem., vol. 1, pp. 121–122 and 131 relied on (1959).

ALEX MAZEL, Primary Examiner

J. A. NARCAVAGE, Assistant Examiner

U.S. Cl. X.R.
260—566, 571, 999